(12) United States Patent
Mamich et al.

(10) Patent No.: US 10,107,674 B2
(45) Date of Patent: Oct. 23, 2018

(54) MOBILE PALLET SCALE

(71) Applicant: TMS International Corporation, Glassport, PA (US)

(72) Inventors: Chuck Mamich, Munster, IN (US); Douglas Blake Norman, Lebanon, MO (US); Fernando Rodriguez Anton, Chicago, IL (US)

(73) Assignee: TMS International Corporation, Glassport, PA (US)

( * ) Notice: Subject to any disclaimer, the term of this patent is extended or adjusted under 35 U.S.C. 154(b) by 218 days.

(21) Appl. No.: 15/151,939

(22) Filed: May 11, 2016

(65) Prior Publication Data

US 2016/0334267 A1 Nov. 17, 2016

Related U.S. Application Data

(60) Provisional application No. 62/162,292, filed on May 15, 2015.

(51) Int. Cl.
| | |
|---|---|
| *G01G 21/28* | (2006.01) |
| *G01G 21/22* | (2006.01) |
| *G01G 23/00* | (2006.01) |
| G01G 17/00 | (2006.01) |
| G01G 19/52 | (2006.01) |

(52) U.S. Cl.
CPC .............. *G01G 21/22* (2013.01); *G01G 21/28* (2013.01); *G01G 23/005* (2013.01); *G01G 17/00* (2013.01); *G01G 19/52* (2013.01)

(58) Field of Classification Search
CPC ...... G01G 21/22; G01G 23/005; G01G 17/00; G01G 19/52; G01G 21/28

USPC ............... 177/126, 132–135, 145, 146
See application file for complete search history.

(56) References Cited

U.S. PATENT DOCUMENTS

| | | | | |
|---|---|---|---|---|
| 2,924,444 | A * | 2/1960 | Greenberger | ........ G01G 3/1406 177/146 |
| 3,217,818 | A * | 11/1965 | Engelsher | .............. G01G 5/006 177/144 |
| 3,578,760 | A * | 5/1971 | Shinmura | ............... F16H 3/089 475/206 |
| 3,679,011 | A * | 7/1972 | Hawver | ................... G01G 3/08 177/134 |
| 3,858,672 | A * | 1/1975 | Mrozek | ................. G01G 19/08 177/136 |

(Continued)

FOREIGN PATENT DOCUMENTS

CN 201534736 U 7/2010

*Primary Examiner* — Randy Gibson
(74) *Attorney, Agent, or Firm* — The Webb Law Firm (57) ABSTRACT

A mobile scale including a lower frame having at least one load cell and an upper deck having at least one load cell engagement surface for engaging the at least one load cell. The upper deck is movable from a first position where the at least one load cell engagement surface is engaged with the at least one load cell to a second position where the at least one load cell engagement surface is disengaged from the at least one load cell. Also, a method of weighing and moving a load. The load is placed on the mobile scale described above. The weight of the load is determined using the load cells when the upper deck is in the first position. The mobile scale is then lifted to transition the upper deck from the first position to the second position and moved to a new location.

15 Claims, 9 Drawing Sheets

(56) References Cited

U.S. PATENT DOCUMENTS

| | | | | |
|---|---|---|---|---|
| 4,878,551 A | * | 11/1989 | Watkins | G01G 19/12 177/139 |
| 4,905,780 A | * | 3/1990 | Goff, III | G01G 17/08 177/136 |
| 5,393,936 A | | 2/1995 | Tyhy et al. | |
| 5,417,536 A | | 5/1995 | Cech | |
| 5,578,798 A | | 11/1996 | Nuyts | |
| 7,504,594 B1 | * | 3/2009 | Ruth | G01G 21/22 177/128 |
| 8,461,466 B2 | * | 6/2013 | Sagarsee | G01G 19/02 177/126 |
| 2013/0062127 A1 | | 3/2013 | Pangrazio et al. | |
| 2018/0002120 A1 | * | 1/2018 | Allegretti | B65G 65/44 |

\* cited by examiner

MOBILE PALLET SCALE

BACKGROUND OF THE INVENTION

Field of the Invention

The present invention relates to a mobile pallet scale for moving and weighing metal, more particularly to a mobile pallet scale where the load cells are disengaged when the pallet scale is being moved.

Description of Related Art

In the metals industry, it is necessary to move and weigh metal scrap and other raw materials used during metal production. Such movement and weighing of a particular container, for example, a charge bucket, of raw materials may occur numerous times during processing as materials are added or removed or the scrap is transported to a new location.

Presently, stationary scales, crane scales, rail mounted scales, and dump truck mounted scales are used for this purpose.

Stationary scales and rail scales require that the material be moved to the location of the stationary scale or within the reach of the cranes. This does not allow for significant flexibility in the operation of the scrap yard/raw materials area and makes maintenance difficult. It also requires additional cranes to be used to move the material closer to the stationary scale or the crane equipped with the scale due to the manner in which scrap piles are created. In addition, crane mounted scales utilize sensors are that one directional in nature and do not provide any correction for lateral loading, which is commonly encountered due to the swaying of the grapple or magnet of the crane that is lifting the load being weighed.

Dump truck scales do not provide an easy way to load directly into the charge bucket and rely on complex hydraulic measuring systems to obtain weight information.

Thus, there is a need for a system to weigh different types of scrap/raw materials that is flexible, robust, and reliable, while at the same time being capable of movement around a steel scrap yard or raw materials handling area.

SUMMARY OF THE INVENTION

The present invention is directed to a mobile scale including a lower frame having at least one load cell and an upper deck having at least one load cell engagement surface for engaging the at least one load cell. The upper deck is movable from a first position where the at least one load cell engagement surface is engaged with the at least one load cell to a second position where the at least one load cell engagement surface is disengaged from the at least one load cell. In the first position, at least a portion of the upper deck may extend in a downward direction through at least one opening in the lower frame.

The lower frame may comprise an upper platform having a first top surface and a second bottom surface, at least two beams extending from the first top surface to the second bottom surface, and at least one opening between the at least two beams. The upper deck may comprise at least one beam extending in a downward direction. In the first position, the at least one beam of the upper deck may extend through the at least one opening in the upper platform of the lower frame and at least a portion of the at least one beam of the upper deck may extend below the second bottom surface of the upper platform. In the second position, a bottom surface of the at least one beam of the upper deck may be even with the second bottom surface of the lower frame. The length in a longitudinal direction of the at least one beam of the upper deck may be greater than the length in a longitudinal direction of the at least two beams of the lower frame. A top load bearing surface of the at least one load cell may be even with the first top surface of the upper platform of the lower frame.

The lower frame and the upper deck may have rectangular shapes and a load cell and a corresponding load cell engagement surface may be provided at each corner.

The mobile scale may further comprise at least one friction reducing engagement member provided on each of the lower frame and upper deck. The at least one friction reducing engagement member on the lower frame engages the at least one friction reducing engagement member on the upper deck to reduce friction when the upper deck is moved from a first position to the second position or returned from the second position to the first position. An outer surface of the at least one friction reducing engagement member of the lower frame may be made from a different material than an outer surface of the at least one friction reducing engagement member of the upper deck.

The present invention is also directed to a method of weighing and moving a load. The load is placed on the mobile scale described above. The weight of the load is determined using the load cells when the upper deck is in the first position. The mobile scale is then lifted to transition the upper deck from the first position to the second position and moved to a new location. The lifting device may contact a portion of the upper deck before it contacts any portion of the lower frame and the portion of the upper deck contacted by the lifting device may extend in a downward direction through at least one opening in the lower frame. Further, the lifting device may contact the at least one beam of the upper deck before contacting the second bottom surface of the lower frame. The lifting device may not contact the lower frame until after the upper deck has been transitioned from the first position to the second position.

When the upper deck is in the second position, both the bottom surface of the at least one beam of the upper deck and the second bottom surface of the upper platform of the lower frame may be contacted by the lifting device.

Clause 1: A mobile scale comprising: a lower frame having at least one load cell and an upper deck having at least one load cell engagement surface for engaging the at least one load cell, wherein the upper deck is movable from a first position where the at least one load cell engagement surface is engaged with the at least one load cell to a second position where the at least one load cell engagement surface is disengaged from the at least one load cell.

Clause 2: The mobile scale of clause 1, wherein in the first position, at least a portion of the upper deck extends in a downward direction through at least one opening in the lower frame.

Clause 3: The mobile scale of clause 1 or clause 2, wherein the lower frame comprises an upper platform having a first top surface and a second bottom surface, at least two beams extending from the first top surface to the second bottom surface, and at least one opening between the at least two beams, and the upper deck comprises at least one beam extending in a downward direction, and, in the first position, the at least one beam of the upper deck extends through the at least one opening in the upper platform of the lower frame and at least a portion of the at least one beam of the upper deck extends below the second bottom surface of the upper platform.

Clause 4: The mobile scale of clause 1-3, wherein a length in a longitudinal direction of the at least one beam of the upper deck is greater than a length in a longitudinal direction of the at least two beams of the lower frame.

Clause 5: The mobile scale of clauses 1-4, wherein a top load bearing surface of the at least one load cell is even with the first top surface of the upper platform of the lower frame.

Clause 6: The mobile scale of clauses 1-5, wherein the lower frame comprises an upper platform having a first top surface and a second bottom surface and the upper deck comprises at least one beam extending in a downward direction, and, in the second position, a bottom surface of the at least one beam of the upper deck is even with the second bottom surface of the lower frame.

Clause 7: The mobile scale of clauses 1-6, wherein the lower frame and the upper deck have rectangular shapes and a load cell and a corresponding load cell engagement surface are provided at each corner.

Clause 8: The mobile scale of clauses 1-7, further comprising at least one friction reducing engagement member provided on each of the lower frame and upper deck, wherein the at least one friction reducing engagement member on the lower frame engages the at least one friction reducing engagement member on the upper deck to reduce friction when the upper deck is moved from a first position to the second position or returned from the second position to the first position.

Clause 9: The mobile scale of clauses 1-8, wherein an outer surface of the at least one friction reducing engagement member of the lower frame is made from a different material than an outer surface of the at least one friction reducing engagement member of the upper deck.

Clause 10: A method of weighing and moving a load comprising: placing the load on a mobile scale comprising: a lower frame having at least one load cell and an upper deck having at least one load cell engagement surface for engaging the at least one load cell, wherein the upper deck is movable from a first position where the at least one load cell engagement surface is engaged with the at least one load cell to a second position where the at least one load cell engagement surface is disengaged from the at least one load cell; determining the weight of the load using the load cells when the upper deck is in the first position; lifting the mobile scale using a lifting device, wherein the lifting of the mobile scale causes the upper deck to transition from the first position to the second position; and moving the mobile scale using the lifting device.

Clause 11: The method of clause 10, wherein the lifting device contacts a portion of the upper deck before it contacts any portion of the lower frame.

Clause 12: The mobile scale of clause 10 or clause 11, wherein the portion of the upper deck contacted by the lifting device extends in a downward direction through at least one opening in the lower frame:

Clause 13: The mobile scale of clauses 10-12, wherein the lower frame comprises an upper platform having a first top surface and a second bottom surface, at least two beams extending from the first top surface to the second bottom surface, and at least one opening between the at least two beams and the upper deck comprises at least one beam extending in a downward direction, wherein, in the first position, the at least one beam of the upper deck extends through the at least one opening in the upper platform of the lower frame and at least a portion of the at least one beam of the upper deck extends below the second bottom surface of the upper platform and the lifting device contacts the at least one beam of the upper deck before contacting the second bottom surface of the lower frame.

Clause 14: The mobile scale of clauses 10-13, wherein a length in the longitudinal direction of the at least one beam of the upper deck is greater than a length in the longitudinal direction of the at least two beams of the lower frame.

Clause 15: The mobile scale of clauses 10-14, wherein a top load bearing surface of the at least one load cell is even with the first top surface of the lower frame.

Clause 16: The method of clauses 10-15, wherein the lower frame comprises an upper platform having a first top surface and a second bottom surface and the upper deck comprises at least one beam extending in a downward direction, and, in the second position, a bottom surface of the at least one beam of the upper deck is even with the second bottom surface of the upper platform of the lower frame and both the bottom surface of the at least one beam of the upper deck and the second bottom surface of the upper platform of the lower frame are contacted by the lifting device.

Clause 17: The method of clauses 10-16, wherein the lifting device does not contact the lower frame until after the upper deck has been transitioned from the first position to the second position.

Clause 18: The method of clauses 10-17, wherein the lower frame and the upper deck have rectangular shapes and a load cell and a corresponding load cell engagement surface are provided at each corner.

Clause 19: The method of clauses 10-18, wherein the mobile scale further comprises at least one friction reducing engagement member provided on each of the lower frame and upper deck, wherein the at least one friction reducing engagement member on the lower frame engages the at least one friction reducing engagement member on the upper deck to reduce friction when the upper deck is moved from a first position to the second position or returned from the second position to the first position.

Clause 20: The mobile scale of clauses 10-19, wherein an outer surface of the at least one friction reducing engagement member of the lower frame is made from a different material than an outer surface of the at least one friction reducing engagement member of the upper deck.

DESCRIPTION OF THE INVENTION

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

The present invention is directed to a mobile scale in which the load cells are engaged when the scale is sitting in a stationary position on the ground and disengaged when the scale is picked up and moved to a different location.

As shown in FIGS. 1-4, 6, and 7, the mobile scale 10 comprises a lower frame 12 and an upper deck 14.

As shown in FIGS. 1-5, 7, and 8, the lower frame 12 has a generally rectangular, horizontal upper platform 16. The upper platform 16 includes a first beam 18 having a first end 20, a second end 22, a first upper surface 24, and a second lower surface 26, and a second beam 28 having a first end 30, a second end 32, a first upper surface 34, and a second lower surface 36. The first beam 18 and the second beam 28 are arranged parallel to one another. At least two cross-beams 38 having a first upper surface 40 and a second lower surface 42 extend between the first beam 18 and the second beam 28. Openings 44 are provided between consecutive cross-beams 38.

Support legs 46 having a first upper end 48 and a second lower end 50 extend vertically downward from the first end 20 and the second end 22 of first beam 18 and the first end 30 and the second end 32 of the second beam 28.

An end beam 52 extends from the first upper end 48 of the support leg 46 located at the first end 20 of the first beam 18 to the first upper end 48 of the support leg 46 at the first end 30 of the second beam 28. A second end beam 52 extends from the first upper end 48 of the support leg 46 at the second end 22 of the first beam 18 to the first upper end 48 of the support leg 46 at the second end 32 of the second beam 28.

A load cell 54 is mounted at the first upper end 48 of each support leg 46. The load cell 54 may communicate through a wired connection or wirelessly so that weight information may be sent to both an interface located in the cab of an accompanying loading crane and also to a coordinator base station. By radio transmitting the data to the loading crane in real time, accurate loading of scrap/raw materials allows for optimization of the scrap/raw material mix.

An opening 56 is provided between a cross-beam 38 extending between the first ends 20, 30 of the first beam 18 and the second beam 28 and the end beam 52 extending between the support legs 46 provided at the first ends 20, 30 of the first beam 18 and the second beam 28. Likewise, an opening 56 is provided between a cross-beam 38 extending between the second ends 22, 32 of the first beam 18 and the second beam 28 and the end beam 52 extending between the support legs 46 at the second ends 22, 32 of the first beam 18 and the second beam 28.

Figure 10:
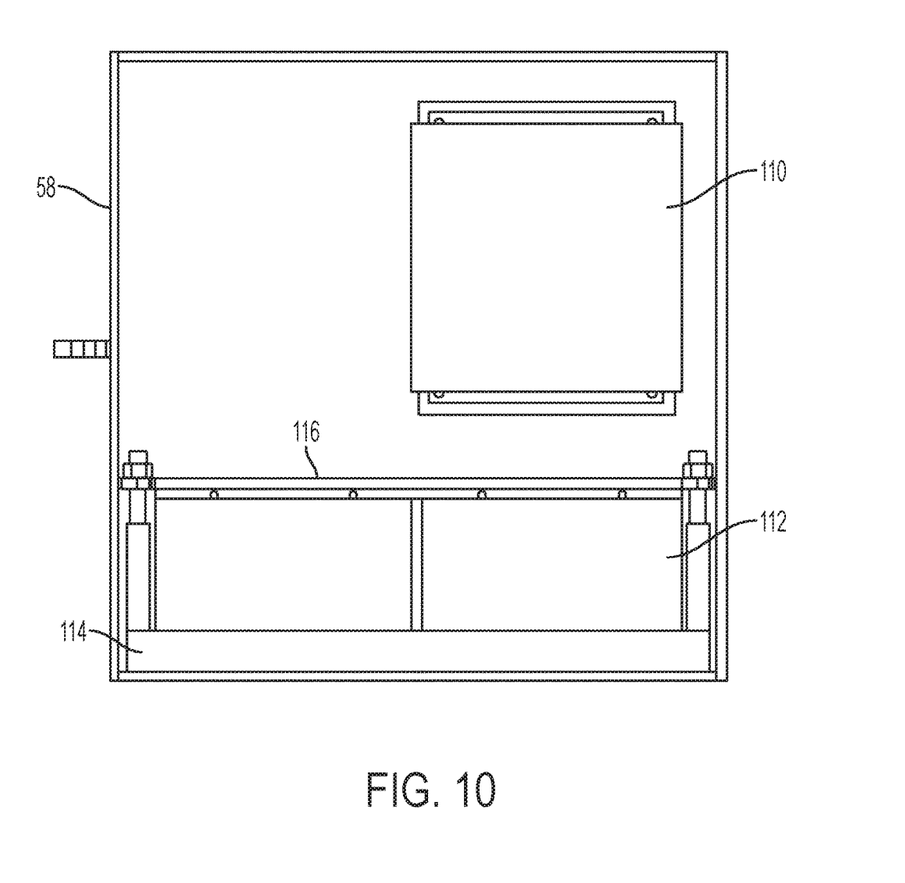
FIG. 10 is a side elevational view of the interior of the equipment enclosure of the mobile scale of the present invention.

An equipment enclosure 58 is mounted to the lower frame 12. The equipment enclosure 58 houses the necessary communications electronics for the load cells 54 including, but not limited to, the DAQ and the data communications radio. The load cells 54 may be wired to the DAQ and the DAQ may communicate wirelessly to the data communications radio. The equipment enclosure protects the electronics 110 from the harsh environment encountered in a scrap yard or other raw materials area. As shown in FIG. 10, the equipment enclosure 58 also holds the batteries 112 used to power the system. The batteries are held in place by a battery box 114 and a battery bar 116.

As shown in FIGS. 1-5, 7, and 8, additional bracing and support beams may be provided to give the lower frame 12 increased strength and stability.

While the lower frame 12 is generally shown as being rectangular in shape, it may take any suitable shape that allows it to carry a container 59 of scrap or raw materials, for example, a charge bucket.

As shown in FIGS. 1-4 and 6-8, the upper deck 14 has a generally rectangular, horizontal upper platform 60. The upper platform 60 includes a first beam 62 having a first end 64, a second end 66, a first upper surface 68, and a second lower surface 70, and a second beam 72 having a first end 74, a second end 76, a first upper surface 78, and a second lower surface 80. The first beam 62 and the second beam 72 are arranged parallel to one another. At least one cross-beam 82 having a first upper surface 84 and a second lower surface 86 extends between the first beam 62 and the second beam 72. Reinforcing beams 88 may extend between adjacent cross-beams 82 in a direction parallel to the first beam 62 and the second beam 72 and perpendicular to the cross-beams 82.

A load cell engagement surface 90 is located on the second lower surface 70, 80 at each of the first ends 64, 74 and the second ends 66, 76 of the first beam 62 and the second beam 72.

An end flange 92 extends from the first end 64 of the first beam 62 to the first end 74 of the second beam 72. A second end flange 92 extends from the second end 66 of the first beam 62 to the second end 76 the second beam 72.

Figure 1:
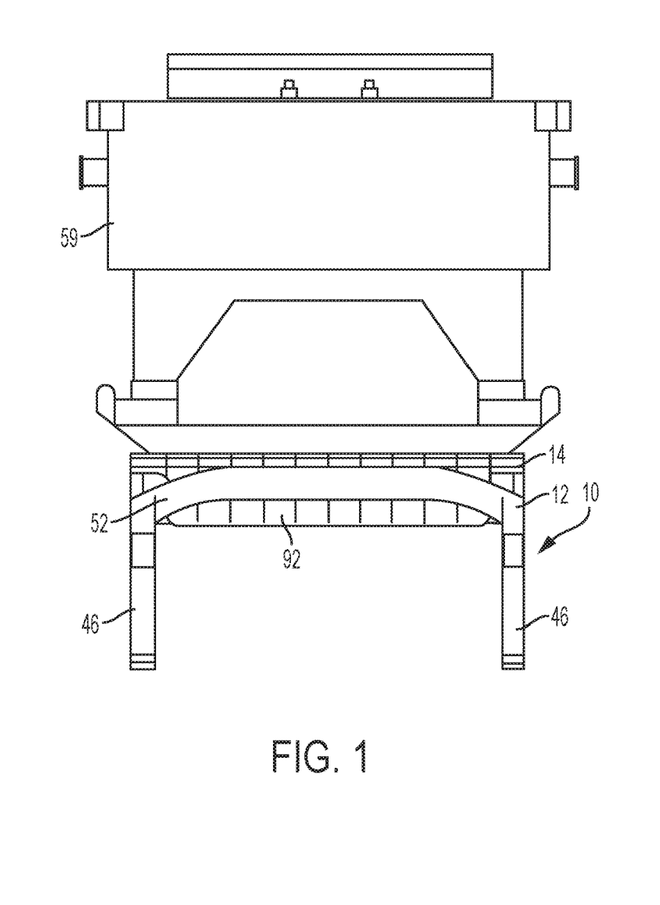
FIG. 1 is a side perspective view of one embodiment of the mobile scale of the present invention with a charge bucket placed on it to be weighed and/or moved.
Figure 2:
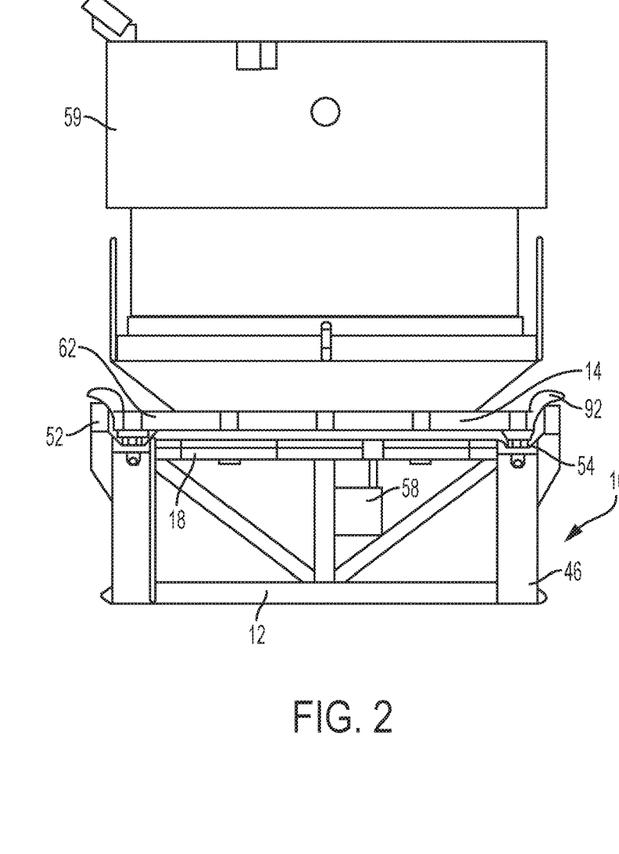
FIG. 2 is a front perspective view of one embodiment of the mobile scale of the present invention with a charge bucket placed on it to be weighed and/or moved.
Figure 3:
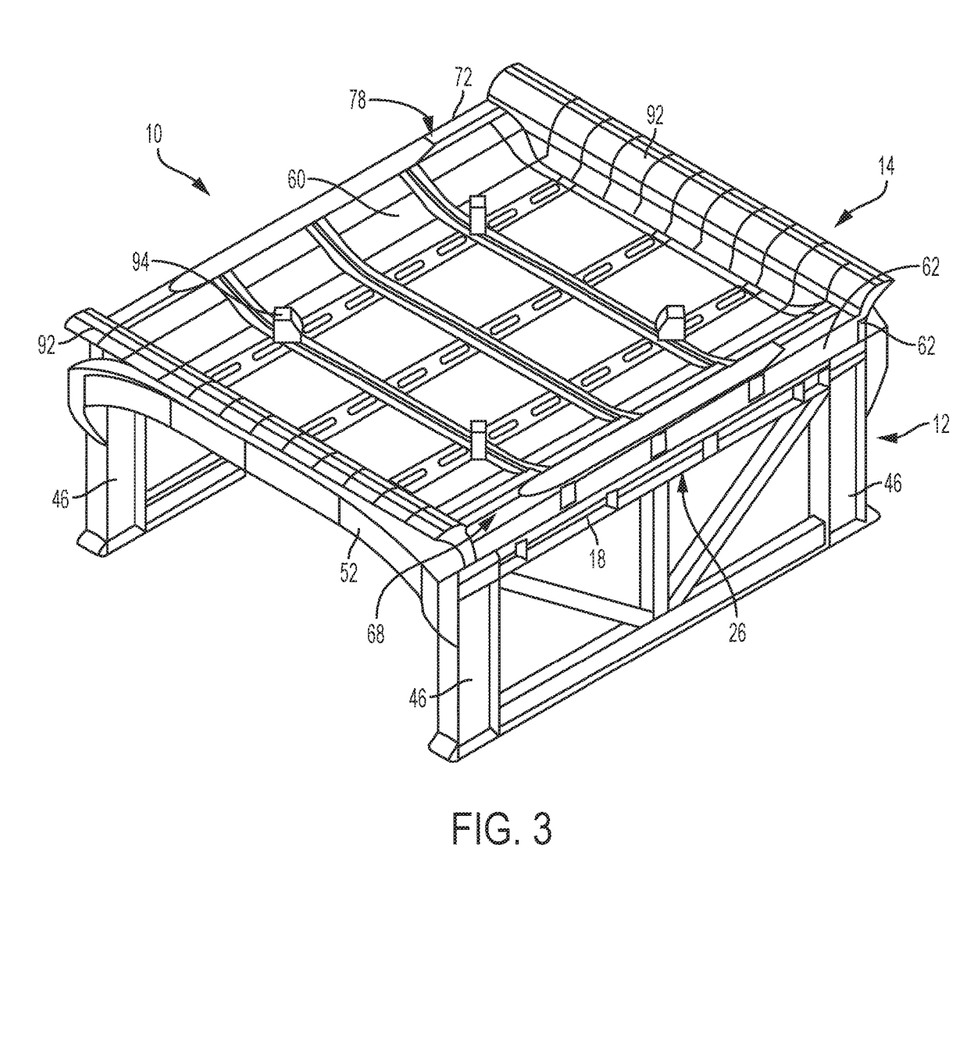
FIG. 3 is top perspective view of one embodiment of the mobile scale of the present invention.
Figure 4:
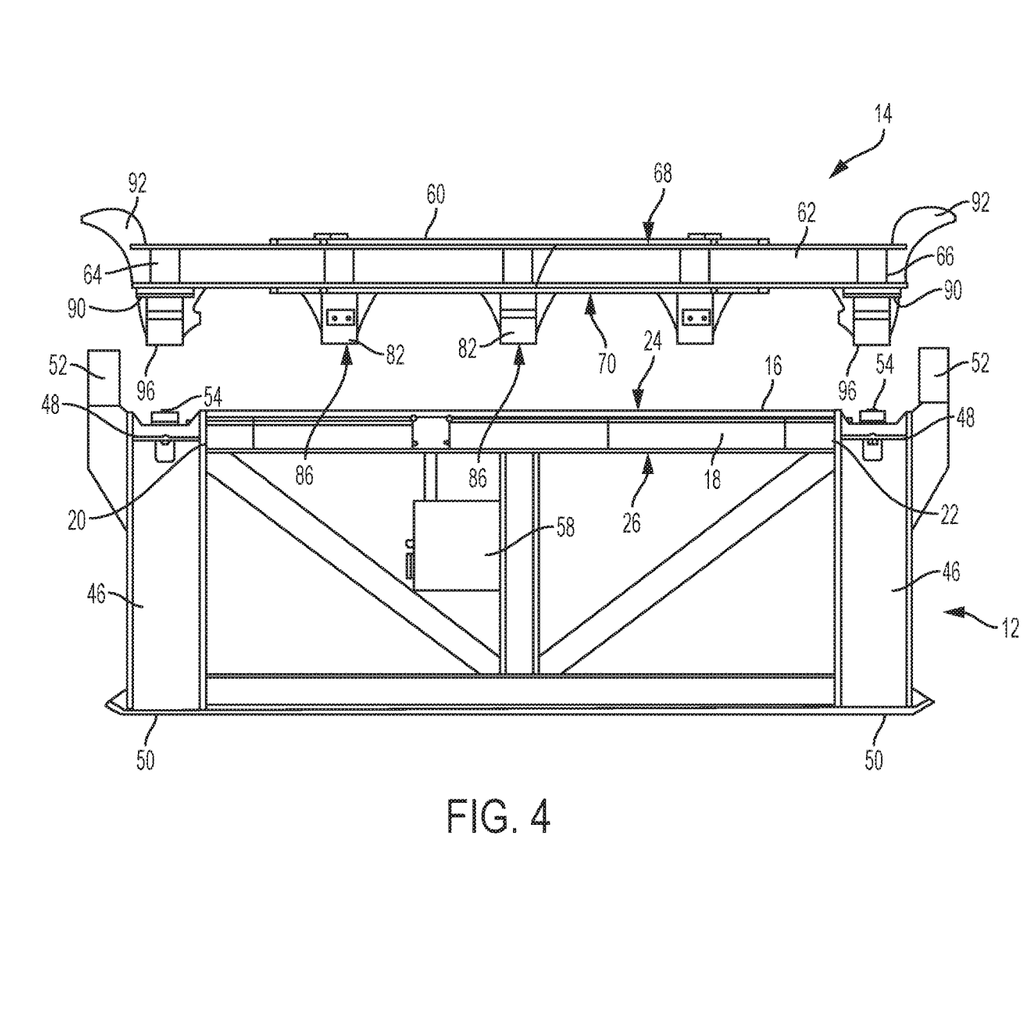
FIG. 4 is an expanded side elevational view of one embodiment of the mobile scale of the present invention.

As shown in FIG. 3, the upper platform 60 may include positioning members 94 for positioning and stabilizing the scrap or raw material container when it is placed on the mobile scale 10.

Figure 6:
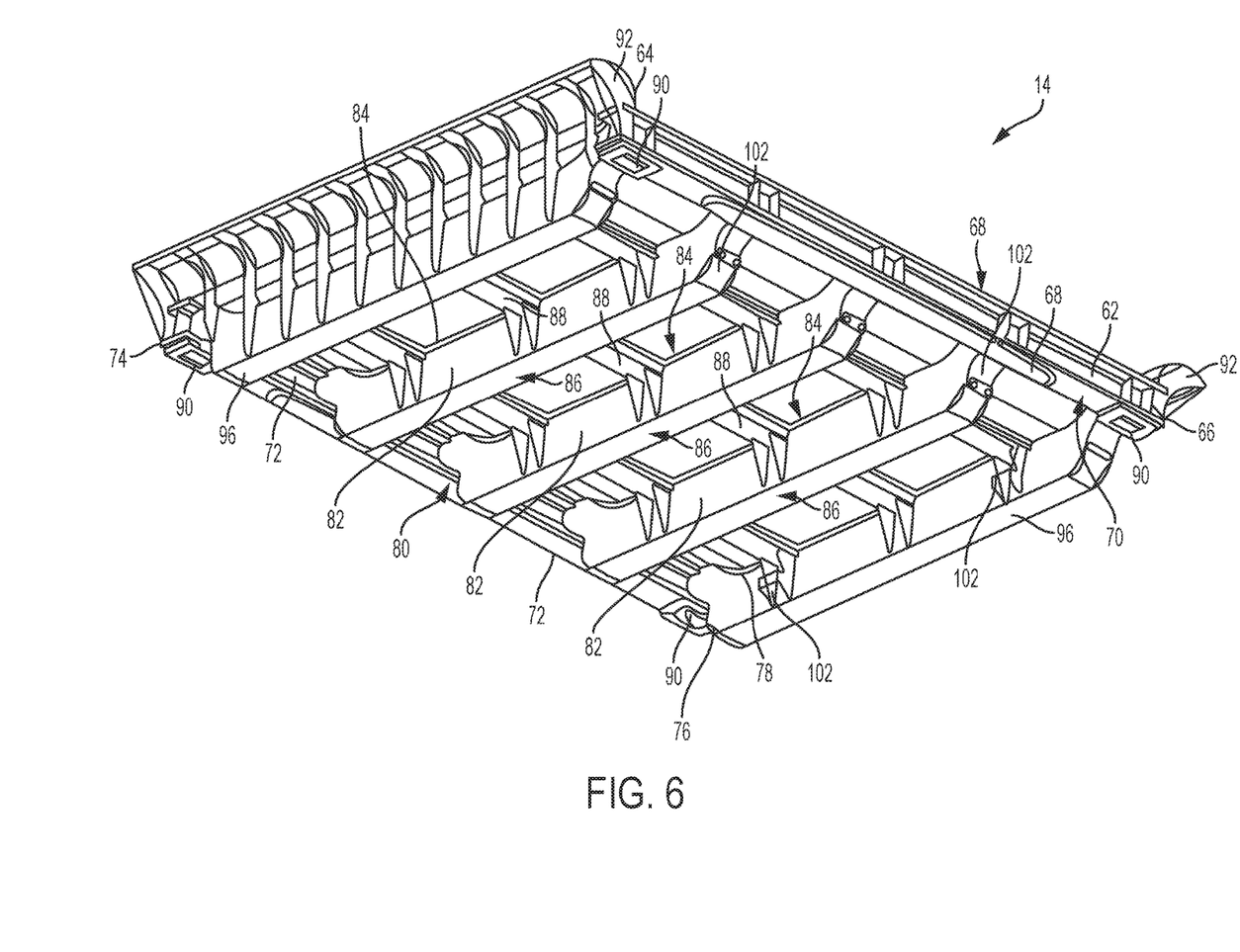
FIG. 6 is a bottom perspective view of one embodiment of an upper deck of the mobile scale of the present invention.

As shown in FIG. 6, additional bracing and support beams may be provided to give the upper deck 14 increased strength and stability.

While the upper deck 14 is generally shown as being rectangular in shape, it may take any suitable shape that allows it to carry a container of scrap or raw materials, for example, a charge bucket.

Figure 7:
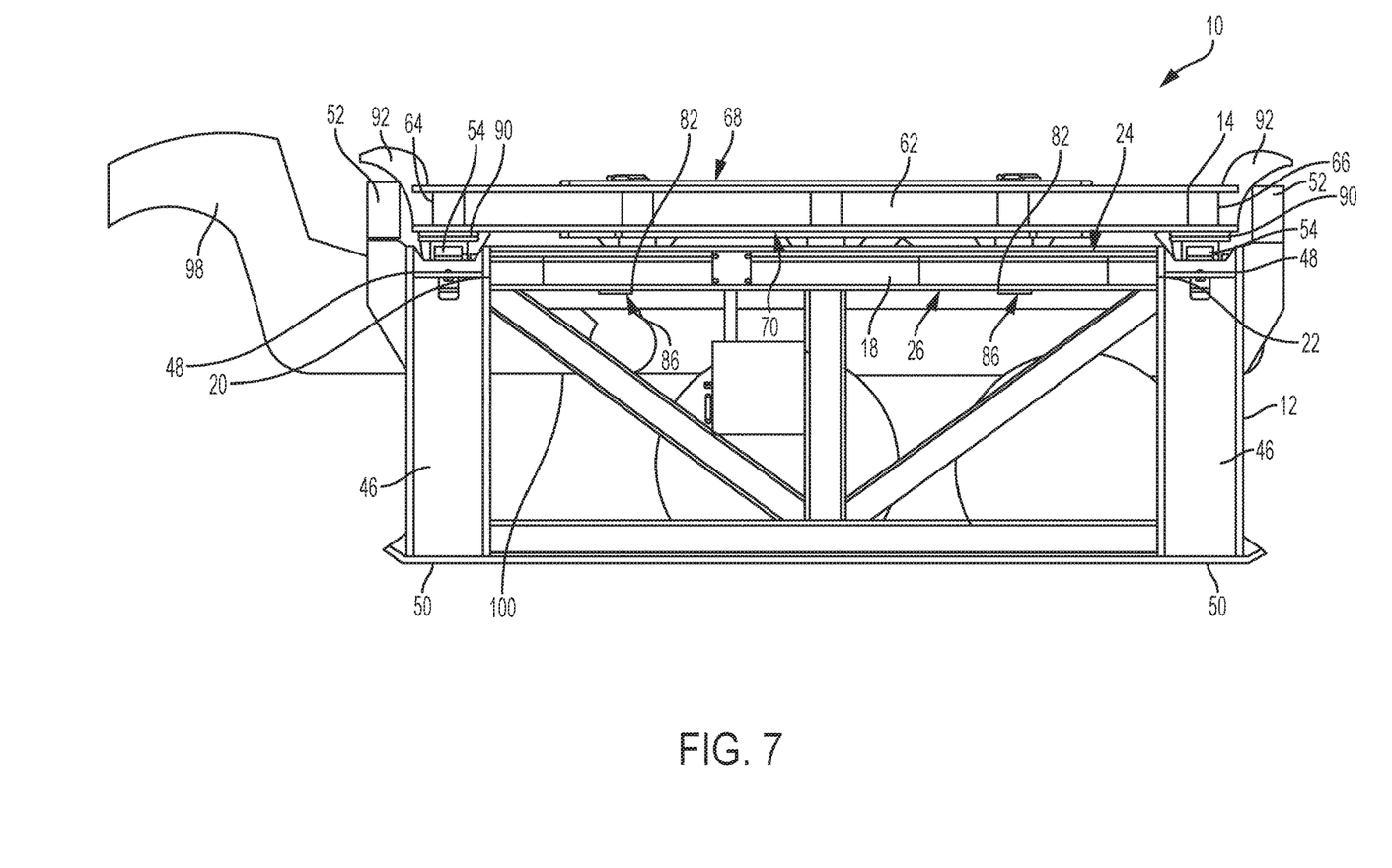
FIG. 7 is a side elevational view of one embodiment of the mobile scale of the present invention in a stationary position.

When the mobile scale 10 is sitting on the ground in a stationary position as shown in FIGS. 6 and 7, the load cell engagement surfaces 90 located on the second lower surface 70, 80 of each of the first beam 62 and the second beam 72 of the upper deck 14 engages the load cells 54 mounted at the first upper end 48 of each support leg 46. In this position, the entire weight of the upper deck 14 and a scrap or raw material container 59 placed thereon is fully supported by the load cells 54 and the lower frame 12 allowing for precise measurements of the load derived from readings obtained from the four symmetrical loading points.

The second lower surface 70 of the first beam 62 of the upper platform 60 of the upper deck 14 is located just above but not touching the first upper surface 24 of the first beam 18 of the lower frame 12 and the second lower surface 80 of the second beam 72 of the upper platform 60 of the upper deck 14 is located just above but not touching the first upper surface 34 of the second beam 28 of the lower frame 12. The cross-beams 82 of the upper platform 60 of the upper deck 14 extend through the openings 44 between the cross-beams 38 of the lower frame 12, and the bottom portion 96 of the end flanges 92 of the upper deck 14 pass through the openings 56 between the end beams 52 and the cross-beams 38 of the lower frame 12.

The length between the first upper surface 84 and the second lower surface 86 of the cross-beams 82 of the upper deck 14 measured in the longitudinal/vertical direction is greater than the length between the first upper surface 40 and the second lower surface 42 of the cross-beams 38 of the lower frame 12 measured in the longitudinal/vertical direction and the length between the first upper surface 24, 34 and the second lower surface 26, 36 of the first beam 18 and the second beam 28 of the lower frame 12 measured in the longitudinal/vertical direction. As such, the cross-beams 82 of the upper deck 14 extend below the second lower surface 42 of the cross-beams 38 of the lower frame 12 and the second lower surfaces 26, 36 of the first beam 18 and the second beam 28 of the lower frame 12.

Figure 8:
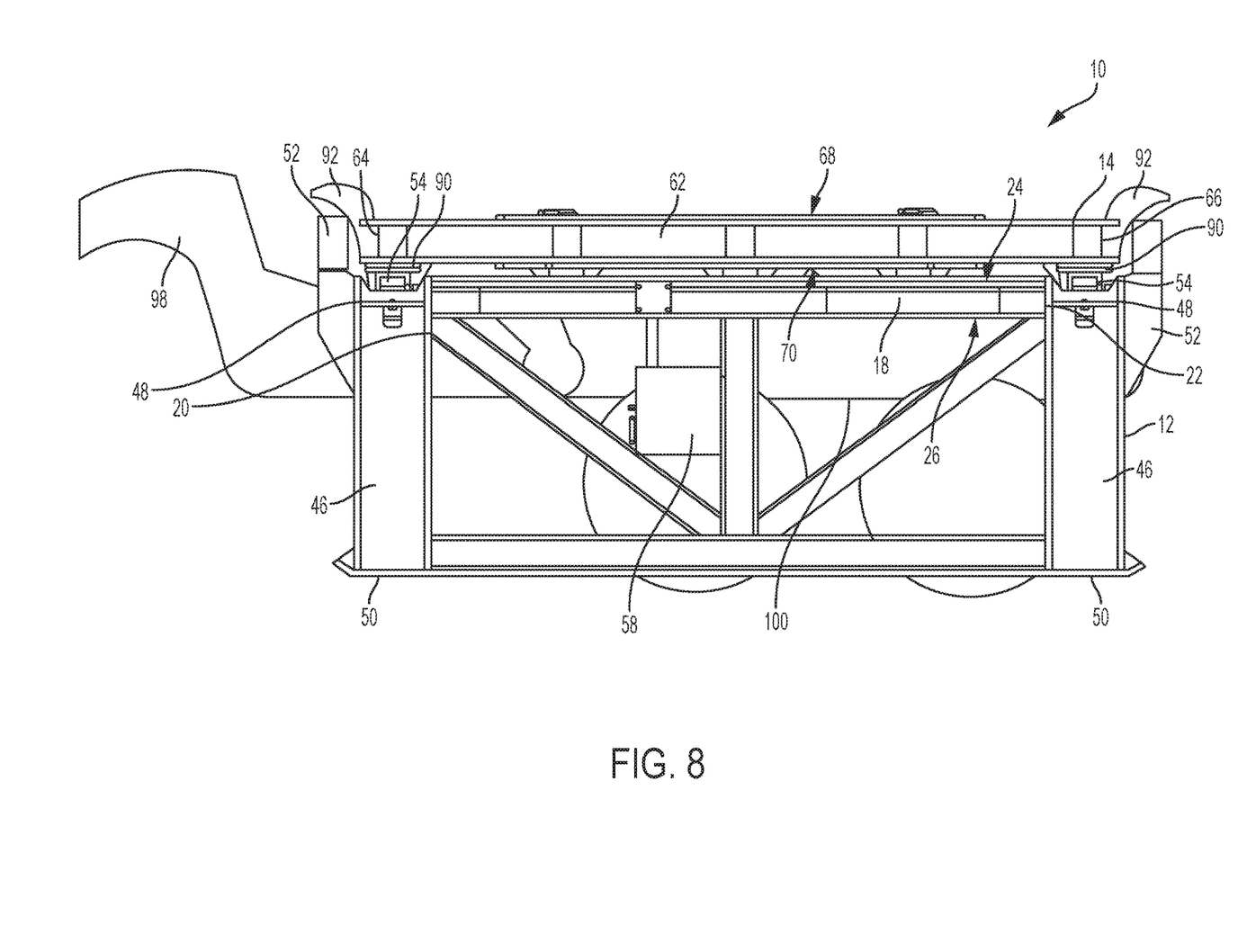
FIG. 8 is a side elevational view of one embodiment of the mobile scale of the present invention in a lifted position for moving.

In use, as shown in FIG. 8, the mobile scale 10 is moved using a pallet carrier 98. The pallet carrier's hydraulic system allows it to raise or lower its trailer 100. When the mobile scale 10 is to be moved, the pallet carrier's trailer 100 is placed in the space under the upper deck 14 and between the support legs 46 of the lower frame 12. As the trailer 100 is raised using the pallet carrier's hydraulic system, its upper surface first contacts the second lower surface 86 of the cross-beams 82 of the upper deck 14 and raises the upper deck 14 with respect to the lower frame 12 placing the weight of the upper deck 14 and any load thereon on the trailer 100 of the pallet carrier 98. The load cell engagement surfaces 90 of the upper deck 14 are disengaged from the load cells 54. As the pallet carrier trailer 100 is further raised, the trailer 100 contacts the second lower surface 42 of the cross-beams 38 of the lower frame 12 lifting the lower frame 12. The weight of the lower frame 12, the upper deck 14, and any load placed thereon is then lifted off the ground by the pallet carrier trailer 100 and can be moved. Because the length between the first upper surface 84 and the second lower surface 86 of the cross-beams 82 of the upper deck 14 is greater than the length between the first upper surface 40 and the second lower surface 42 of the cross-beams 38 of the lower frame 12 and the distance between the first upper surface 24, 34 and the second lower surface 26, 36 of the first beam 18 and the second beam 28 of the lower frame 12, the load cell engagement surface 90 of the upper deck 14 remains disengaged from the load cells 54 as the load is moved. In this way, the load cells 54 are unloaded whenever the mobile scale 10 is lifted off of the ground. Any dynamic loads experienced during movement of a heavy load over rough terrain will not be transferred to the load cells 54 improving the life of the load cells 54 and their accuracy.

Figure 5:
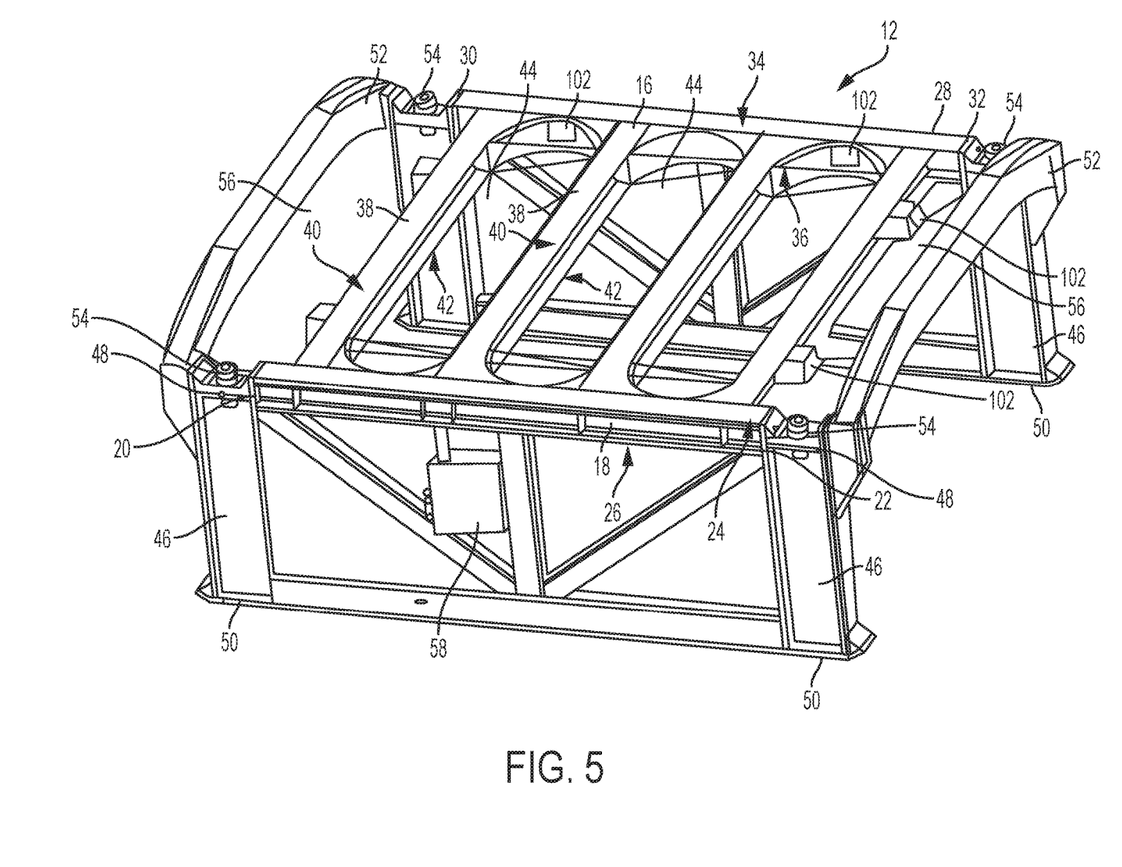
FIG. 5 is a top perspective view of one embodiment of a lower frame of the mobile scale of the present invention.
Figure 9:
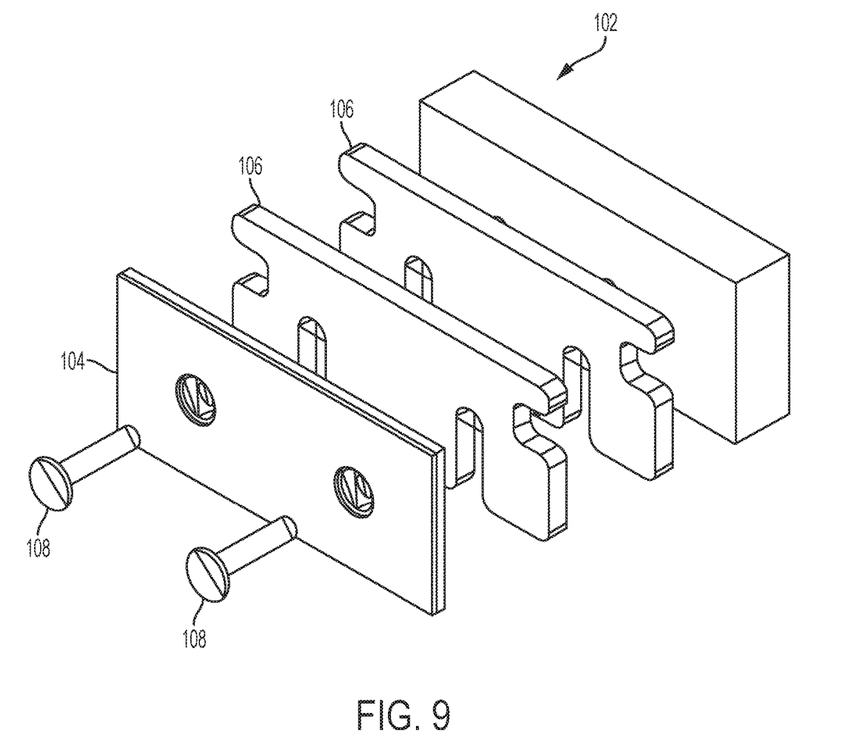
FIG. 9 is a side perspective view of one embodiment of an engagement member of the mobile scale of the present invention.

Contact between the upper deck 14 and the lower frame 12 as the upper deck is transitioned from the first position where the load cell engagement surfaces 90 contact the load cells 54 to the second position where the load cell engagement surfaces 90 are no longer in contact with the load cells 54 is avoided by providing gaps between the structure of the upper deck 14 and the lower frame 12. For example, a gap is provided between the cross-beams 82 of the upper deck 14 and the first beam 18 and second beam 28 of the lower frame 12 and between the bottom portion 96 of the end flanges 92 of the upper deck 14 and the openings 56 between the end beams 52 and the cross-beams 38 of the lower frame 12. However, any contact points between the lower frame 12 and the upper deck 14, which might contact one another during the transition of the upper deck 14 from the first position to the second position when the upper deck 14 is out of alignment with the lower frame 12, may be protected by mating engagement members 102 as shown in FIGS. 5 and 6. The outer surface elements 104 of the engagement members 102 if the lower frame 12 may be made from the same material as the outer surface elements 104 of the engagement members 102 of the upper deck 14 or may be made from a different material than the outer surface elements 104 of the engagement members 102 of the upper deck 14. For example, the outer surface elements 104 of the engagement members 102 of the lower frame 12 may be made from a polished stainless steel plate or any other suitable low friction material including, but not limited to other polished metals, and the outer surface elements 104 of the engagement members 102 of the upper deck 14 may be made from a Teflon® pad or any other suitable low friction material including, but not limited to other low friction polymers. The smooth motion between the engagement member 102 of the lower frame 12 and the engagement member 102 of the upper deck 14 prevents the introduction of extraneous loads onto the load cells 54 and increases the accuracy of the system. These engagement members 102 help to guide the motion of the upper deck 14 to make sure that, when engaged, the load cells 54 are contacted correctly. As shown in FIG. 9, the amount of play between the engagement members 102 can be altered by the use of shims 106 that can be inserted behind the outer surface element 104 of the engagement member 102, for example, behind the Teflon® pad or the stainless steel plate, thus making sure that the fit is tight, and preventing the upper deck 14 from coming loose from the lower frame 12.

The engagement members 102 can be attached to the lower frame 12 or upper deck 14 using any suitable method including, but not limited to, screws 108, bolts, threaded rods with nuts, welds, and the like.

While the engagement members 102 are shown in FIGS. 5 and 6 as being in specific discrete locations on the lower frame 12 and the upper deck 14, the engagement members 102 may take any suitable size, shape, or position as long as they reduce the friction between the contacting surfaces of the lower frame 12 and the upper deck 14.

While the use of the mobile scale has been described herein with reference to a scrapyard feeding a melting furnace. It should be kept in mind that the mobile scale can be used in any application where accurate measurements of materials that must be moved around are needed. This mobile scale eliminates the need for additional movement of the material to stationary scales and allows for weight measurements to be taken at any point during the movement of the material by just setting the scale down on the ground.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. A mobile scale comprising:
a lower frame comprising a lifting portion having a first top surface and a second bottom surface, and at least one load cell; and
an upper deck having a portion having a first top surface and a second bottom surface and extending in a downward direction through at least one opening in the lifting portion of the lower frame and at least one load cell engagement surface for engaging the at least one load cell,
wherein the upper deck is movable from a first position where the at least one load cell engagement surface is engaged with the at least one load cell to a second position where the at least one load cell engagement surface is disengaged from the at least one load cell, and
wherein, in the second position, the second bottom surface of the portion of the upper deck is even with the second bottom surface of the lifting portion of the lower frame.

2. The mobile scale of claim 1, wherein the lifting portion of the lower frame comprises an upper platform having a first top surface and a second bottom surface, at least two beams extending from the first top surface to the second bottom surface, and at least one opening between the at least two beams, and the upper deck comprises at least one beam extending in a downward direction, and, in the first position, the at least one beam of the upper deck extends through the at least one opening in the upper platform of the lower frame and at least a portion of the at least one beam of the upper deck extends below the second bottom surface of the upper platform.

3. The mobile scale of claim 2, wherein a length in a longitudinal direction of the at least one beam of the upper deck is greater than a length in a longitudinal direction of the at least two beams of the lower frame.

4. The mobile scale of claim 2, wherein a top load bearing surface of the at least one load cell is even with the first top surface of the upper platform of the lower frame.

5. The mobile scale of claim 1, wherein the lower frame and the upper deck have rectangular shapes and a load cell and a corresponding load cell engagement surface are provided at each corner.

6. The mobile scale of claim 1, further comprising at least one friction reducing engagement member provided on each of the lower frame and upper deck, wherein the at least one friction reducing engagement member on the lower frame engages the at least one friction reducing engagement member on the upper deck to reduce friction when the upper deck is moved from a first position to the second position or returned from the second position to the first position.

7. The mobile scale of claim 6, wherein an outer surface of the at least one friction reducing engagement member of the lower frame is made from a different material than an outer surface of the at least one friction reducing engagement member of the upper deck.

8. A method of weighing and moving a load comprising:
placing the load on a mobile scale comprising:
a lower frame having a lifting portion having a first top surface, a second bottom surface, and at least one load cell; and
an upper deck having at least one load cell engagement surface for engaging the at least one load cell,
wherein the upper deck is movable from a first position where the at least one load cell engagement surface is engaged with the at least one load cell to a second position where the at least one load cell engagement surface is disengaged from the at least one load cell, and
determining the weight of the load using the at least one load cell when the upper deck is in the first position;
lifting the mobile scale using a lifting device, wherein the lifting device first contacts at least a portion of the upper deck to transition the upper deck from the first position to the second position before contacting the lower frame and lifting the lower frame; and
moving the mobile scale using the lifting device.

9. A mobile scale comprising:
a lower frame having at least one load cell; and
an upper deck having at least one load cell engagement surface for engaging the at least one load cell,
wherein the upper deck is movable from a first position where the at least one load cell engagement surface is engaged with the at least one load cell to a second position where the at least one load cell engagement surface is disengaged from the at least one load cell,
wherein the lower frame comprises an upper platform having a first top surface and a second bottom surface, at least two beams extending from the first top surface to the second bottom surface, and at least one opening between the at least two beams, and the upper deck comprises at least one beam extending in a downward direction, and, in the first position, the at least one beam of the upper deck extends through the at least one opening in the upper platform of the lower frame and at least a portion of the at least one beam of the upper deck extends below the second bottom surface of the upper platform, and
wherein a load bearing surface of the at least one load cell is even with the first top surface of the upper platform of the lower frame.

10. The mobile scale of claim 9, wherein in the first position, at least a portion of the upper deck extends in a downward direction through at least one opening in the lower frame.

11. The mobile scale of claim 9, wherein the lower frame comprises an upper platform having a first top surface and a second bottom surface, at least two beams extending from the first top surface to the second bottom surface, and at least one opening between the at least two beams, and the upper deck comprises at least one beam extending in a downward direction, and, in the first position, the at least one beam of the upper deck extends through the at least one opening in the upper platform of the lower frame and at least a portion of the at least one beam of the upper deck extends below the second bottom surface of the upper platform.

12. The mobile scale of claim 11, wherein a length in a longitudinal direction of the at least one beam of the upper deck is greater than a length in a longitudinal direction of the at least two beams of the lower frame.

13. The mobile scale of claim 9, wherein the lower frame and the upper deck have rectangular shapes and a load cell and a corresponding load cell engagement surface are provided at each corner.

14. The mobile scale of claim 9, further comprising at least one friction reducing engagement member provided on each of the lower frame and upper deck, wherein the at least one friction reducing engagement member on the lower frame engages the at least one friction reducing engagement member on the upper deck to reduce friction when the upper deck is moved from a first position to the second position or returned from the second position to the first position.

15. The mobile scale of claim 14, wherein an outer surface of the at least one friction reducing engagement member of the lower frame is made from a different material than an outer surface of the at least one friction reducing engagement member of the upper deck.

* * * * *